United States Patent
Wong et al.

(10) Patent No.: US 10,133,332 B2
(45) Date of Patent: Nov. 20, 2018

(54) LOCATION AWARE POWER MANAGEMENT SCHEME FOR ALWAYS-ON-ALWAYS-LISTEN VOICE RECOGNITION SYSTEM

(71) Applicant: Intel Corporation, Santa Clara, CA (US)

(72) Inventors: Hong W. Wong, Portland, OR (US); Wah Yiu Kwong, Hillsboro, OR (US); Xiaoguo Liang, Shanghai (CN); Jiancheng Tao, Shanghai (CN); Jian Wang, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/113,780

(22) PCT Filed: Mar. 31, 2014

(86) PCT No.: PCT/CN2014/074363
§ 371 (c)(1),
(2) Date: Jul. 22, 2016

(87) PCT Pub. No.: WO2015/149216
PCT Pub. Date: Oct. 8, 2015

(65) Prior Publication Data
US 2017/0031420 A1    Feb. 2, 2017

(51) Int. Cl.
*G10L 25/78* (2013.01)
*G06F 1/32* (2006.01)
(Continued)

(52) U.S. Cl.
CPC .......... *G06F 1/3206* (2013.01); *G06F 1/3293* (2013.01); *G06F 3/167* (2013.01);
(Continued)

(58) Field of Classification Search
CPC ............ H04W 52/0254; G06F 1/3206; G10L 2025/786; G10L 25/84
See application file for complete search history.

(56) References Cited

U.S. PATENT DOCUMENTS

2003/0187931 A1   10/2003   Olsen et al.
2004/0138877 A1   7/2004    Ariu
(Continued)

FOREIGN PATENT DOCUMENTS

CN   101127540 A   2/2008
CN   102859592 A   1/2013
(Continued)

OTHER PUBLICATIONS

Communication received from European Patent Office for European Patent Application No. 14887894.5, dated Nov. 11, 2016, 2 pages.
(Continued)

*Primary Examiner* — Albert Wang
(74) *Attorney, Agent, or Firm* — Spectrum IP Law Group LLC (57) ABSTRACT

Methods and apparatus relating to a location aware power management scheme for an always-on-always-listen voice recognition system are described. In an embodiment, logic performs ambient noise trigger level analysis for a location and causes storage of an ambient noise trigger level threshold value for the location based on the ambient noise trigger level analysis. Furthermore, logic determines whether to cause modification to a state of an audio processor in response to detection of the audio processor at the location and comparison of a detected sound level at the location and the stored ambient noise trigger level threshold value. Other embodiments are also disclosed and claimed.

25 Claims, 6 Drawing Sheets

(51) Int. Cl.
  *H04W 52/02* (2009.01)
  *G06F 3/16* (2006.01)
  *G10L 25/84* (2013.01)
  *H04M 1/725* (2006.01)
  *G10L 15/20* (2006.01)

(52) U.S. Cl.
  CPC ......... *G10L 25/84* (2013.01); *H04W 52/0254* (2013.01); *G10L 15/20* (2013.01); *G10L 2025/786* (2013.01); *H04M 1/72569* (2013.01); *H04M 1/72572* (2013.01); *H04M 2250/74* (2013.01); *Y02D 10/122* (2018.01); *Y02D 70/00* (2018.01); *Y02D 70/142* (2018.01); *Y02D 70/144* (2018.01); *Y02D 70/164* (2018.01); *Y02D 70/26* (2018.01)

(56) References Cited

U.S. PATENT DOCUMENTS

| | | | |
|---|---|---|---|
| 2011/0300806 A1 | 12/2011 | Lindahl et al. | |
| 2012/0034904 A1 | 2/2012 | Lebeau et al. | |
| 2013/0223635 A1* | 8/2013 | Singer | H04R 1/1041 381/56 |
| 2013/0246071 A1 | 9/2013 | Lee et al. | |
| 2013/0339028 A1 | 12/2013 | Rosner et al. | |
| 2014/0024392 A1 | 1/2014 | Su et al. | |
| 2014/0122078 A1* | 5/2014 | Joshi | G06F 1/324 704/251 |
| 2015/0081296 A1* | 3/2015 | Lee | G10L 15/20 704/239 |

FOREIGN PATENT DOCUMENTS

| | | |
|---|---|---|
| CN | 103282957 A | 9/2013 |
| CN | 103310785 A | 9/2013 |
| CN | 106062661 A | 10/2016 |
| EP | 3126929 A | 2/2017 |
| JP | 2013171462 A | 9/2013 |
| KR | 10-2016-0113255 A | 9/2016 |
| WO | 2014/035119 A2 | 3/2014 |
| WO | 2015/149216 A1 | 10/2015 |

OTHER PUBLICATIONS

International Search Report and Written Opinion received for International Patent Application No. PCT/CN2014/074363, dated Dec. 30, 2014, 11 pages.

Communication received for European Patent Application No. 14887894.5, dated Nov. 10, 2017, 1 page.

Office Action received for Korean Patent Application No. 10-2016-7023360 dated May 31, 2018, 7 pages including 1 page if English summary.

Office Action received for Korean Patent Application No. 10-2016-7023360, dated Oct. 16, 2017, 7 pages including 1 page of English translation.

Extended European Search Report received for European Patent Application No. 14887894.5, dated Oct. 24, 2017, 9 pages.

Office Action received for Chinese Patent Application No. 2018072701841670, dated Aug. 1, 2018, 10 pages.

* cited by examiner

LOCATION AWARE POWER MANAGEMENT SCHEME FOR ALWAYS-ON-ALWAYS-LISTEN VOICE RECOGNITION SYSTEM

RELATED APPLICATIONS

The present application is a national stage application under 35 U.S.C. § 371 of International Application No. PCT/CN2014/074363 filed on Mar. 31, 2014. Said Application No. PCT/CN2014/074363, is hereby incorporated herein by reference in its entireties.

FIELD

The present disclosure generally relates to the field of electronics. More particularly, an embodiment relates to a location aware power management scheme for an always-on-always-listen voice recognition system.

BACKGROUND

Portable computing devices are gaining popularity, in part, because of their decreasing prices and increasing performance. Another reason for their increasing popularity may be due to the fact that some portable computing devices may be operated at many locations, e.g., by relying on battery power. However, as more functionality is integrated into portable computing devices, the need to reduce power consumption becomes increasingly important, for example, to maintain battery power for an extended period of time.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, various embodiments may be practiced without the specific details. In other instances, well-known methods, procedures, components, and circuits have not been described in detail so as not to obscure the particular embodiments. Further, various aspects of embodiments may be performed using various means, such as integrated semiconductor circuits ("hardware"), computer-readable instructions organized into one or more programs ("software"), or some combination of hardware and software. For the purposes of this disclosure reference to "logic" shall mean either hardware, software, firmware, or some combination thereof.

As discussed above, efficient power consumption management is extremely important for mobile computing devices. One type of component present in a mobile device that may have a significant effect on power consumption is audio. False triggers of the always-on-always-listen voice recognition system will impact the system battery life in the mobile devices. For example, a DSP (Digital Signal Processor) based Always-on-always-listen (or WoV—Wake On Voice) system may consume 4 mW in active "Key Phrase Detection" state (versus just a few uW in idle and "Voice Command Detection" state).

To this end, some embodiments provide location aware power management schemes for always-on-always-listen (or WoV) voice recognition systems. An embodiment reduces the frequency of DSP in active "Key Phrase Detection" state (where the active "Key Phrase Detection" state may be entered due to false triggering of the "Voice Command Detection" state of the WoV system). This approach in turn reduces overall system power consumption. Some embodiments may also provide better UX (User experience) by automating the setting of the ambient noise trigger profile for the "Voice Command Detection" state (which would cause entry into an active and "Key Phrase Detection" state, for example) at least in part based on the location of the system in use.

Some implementations may reduce the false trigger rate by having a user manually set the ambient noise trigger threshold for "Voice Command Detection" state per the location of the system in use. For example, the system may include the noise trigger threshold for various locations, such as at the office, lab, etc. The system then may allow the user to select the threshold "manually" for "Voice Command Detection" state according to the location of the system in use. By contrast, an embodiment utilizes one or more sensors to automate this process to set the ambient noise trigger level and minimize false triggering of the "Key Phrase Detection" state in the always-on-always-listen voice recognition system. This in turn lowers overall system power consumption and may also provide better UX to the end users.

Figure 1:
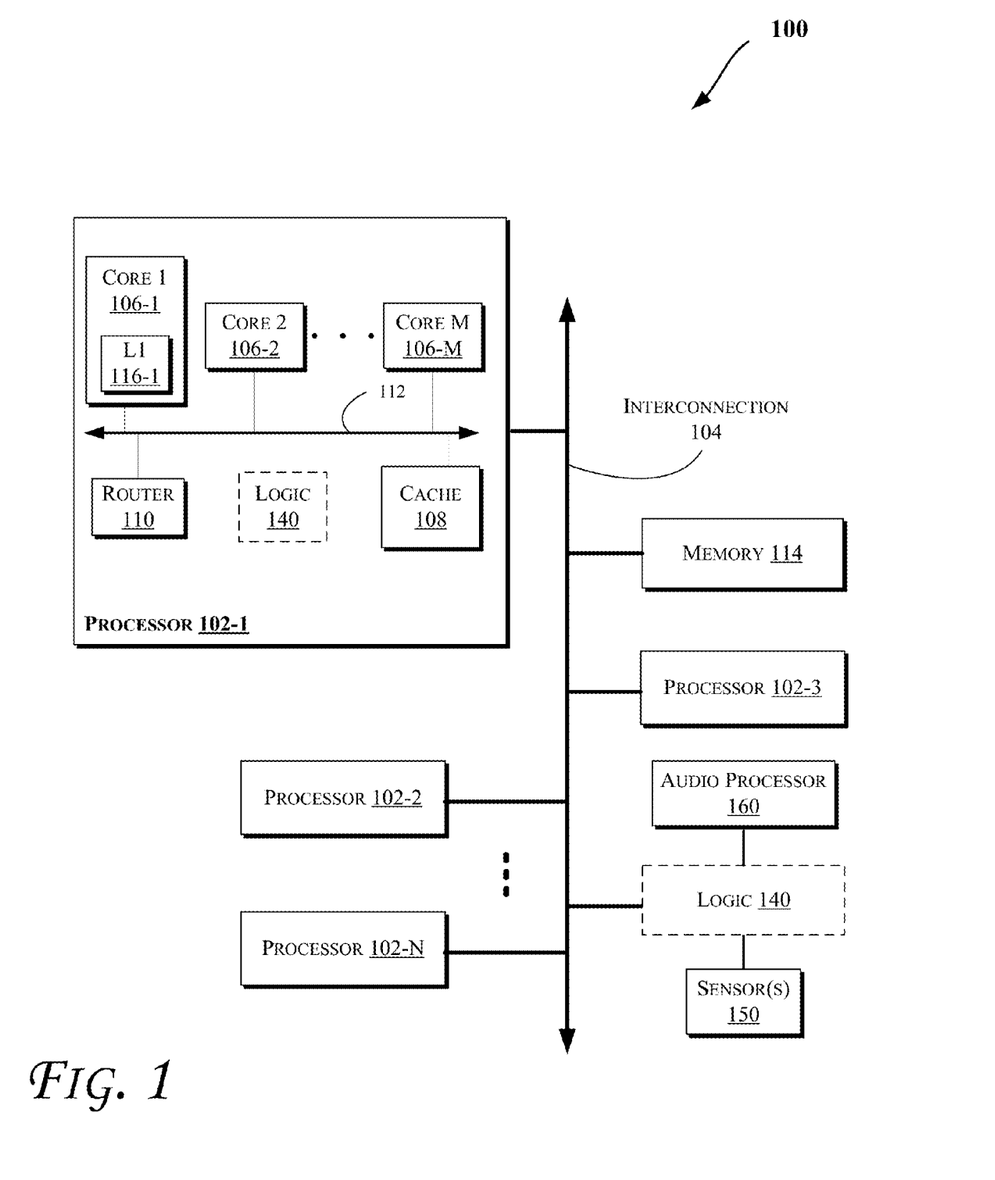
FIGS. 1 and 4-5 illustrate block diagrams of embodiments of computing systems, which may be utilized to implement various embodiments discussed herein.

Some embodiments may be applied in computing systems that include one or more processors (e.g., with one or more processor cores), such as those discussed with reference to FIGS. 1-6, including for example mobile computing devices such as a smartphone, tablet, UMPC (Ultra-Mobile Personal Computer), laptop computer, Ultrabook™ computing device, smart watch, smart glasses, wearable devices, etc. More particularly, FIG. 1 illustrates a block diagram of a computing system 100, according to an embodiment. The system 100 may include one or more processors 102-1 through 102-N (generally referred to herein as "processors 102" or "processor 102"). The processors 102 may be general-purpose CPUs (Central Processing Units) and/or GPUs (Graphics Processing Units) in various embodiments. The processors 102 may communicate via an interconnection or bus 104. Each processor may include various components some of which are only discussed with reference to processor 102-1 for clarity. Accordingly, each of the remaining processors 102-2 through 102-N may include the same or similar components discussed with reference to the processor 102-1.

In an embodiment, the processor 102-1 may include one or more processor cores 106-1 through 106-M (referred to herein as "cores 106," or "core 106"), a cache 108, and/or a router 110. The processor cores 106 may be implemented on a single integrated circuit (IC) chip. Moreover, the chip may include one or more shared and/or private caches (such as cache 108), buses or interconnections (such as a bus or interconnection 112), graphics and/or memory controllers (such as those discussed with reference to FIGS. 2-6), or other components.

In one embodiment, the router 110 may be used to communicate between various components of the processor 102-1 and/or system 100. Moreover, the processor 102-1 may include more than one router 110. Furthermore, the multitude of routers 110 may be in communication to enable data routing between various components inside or outside of the processor 102-1.

The cache 108 may store data (e.g., including instructions) that are utilized by one or more components of the processor 102-1, such as the cores 106. For example, the cache 108 may locally cache data stored in a memory 114 for faster access by the components of the processor 102 (e.g., faster access by cores 106). As shown in FIG. 1, the memory 114 may communicate with the processors 102 via the interconnection 104. In an embodiment, the cache 108 (that may be shared) may be a mid-level cache (MLC), a last level cache (LLC), etc. Also, each of the cores 106 may include a level 1 (L1) cache (116-1) (generally referred to herein as "L1 cache 116") or other levels of cache such as a level 2 (L2) cache. Moreover, various components of the processor 102-1 may communicate with the cache 108 directly, through a bus (e.g., the bus 112), and/or a memory controller or hub.

As shown, system 100 may also include logic 140, one or more sensors 150, and an audio processor 160 (such as a DSP, etc.). Sensor(s) 150 provide sensor data (such as location data detected via a Global Positioning System (GPS) sensor (including for example advanced GPS (aGPS), Global Navigation Satellite System (GNSS)), Wireless Fidelity (WiFi), Bluetooth, etc. sensor(s)), ambient audio sensor(s), accelerometer, compass, gyro, magnetometer, pressure, ambient light, temperature, etc.) to enhance the user experience (e.g., when using computing devices including for example mobile computing devices such as a smartphone, tablet, UMPC (Ultra-Mobile Personal Computer), laptop computer, Ultrabook™ computing device, smart watch, smart glasses, wearable devices, etc.) for a whole range of applications (such as audio settings, phone settings, games, etc.). Sensor(s) 150 may support various features including always-on sensing (such as always-on-always-listen voice recognition system), motion-based gestures, user activity state, pedometer, etc.) to enable different categories of applications.

In an embodiment, logic 140 reduces the frequency of the audio processor 160 in active "Key Phrase Detection" state, e.g., based on information detected by the sensor(s) 150. This approach reduces overall system power consumption. Logic 140 may also provide better UX by automating the setting of the ambient noise trigger profile at least in part based on the location of the system in use, e.g., as detected by the sensor(s) 150. Furthermore, logic 140 may be provided in various locations in system 100 such as those shown or otherwise. Hence, logic 140 is communicatively coupled to the audio processor 160 and/or sensor(s) 150 to provide the features discussed with reference to various embodiments. Additionally, logic 140 may include the audio processor 160 in some embodiments.

Figure 2:
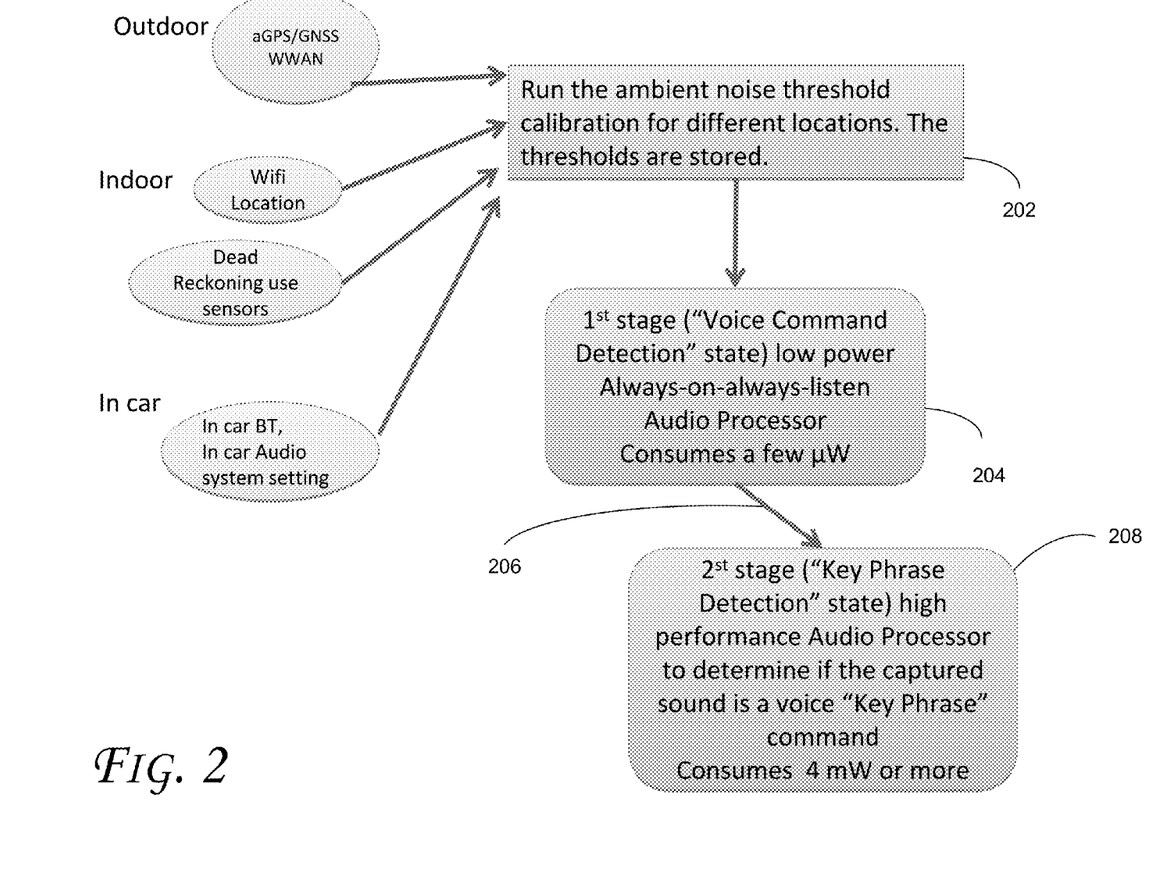
FIGS. 2-3 illustrate flow diagrams in accordance with some embodiments.

FIG. 2 illustrates a flow chart for location aware setting of the ambient noise threshold for always-on-always listen voice recognition system, according to an embodiment. As shown, one or more sensors (e.g., sensor(s) 150) may be used to determine the location of the computing device in use and set the ambient noise trigger level for the "Voice Command Detection" state accordingly. Various operations discussed with reference to FIG. 2 may be performed by one or more of the components of FIG. 1 (e.g., including one or more of: processor core(s) 106, logic 140, sensor(s) 150, and/or audio processor 160.

Referring to FIGS. 1-2, at an operation 202, ambient noise threshold calibration (also interchangeably referred to herein as analysis) operation(s) are run (e.g., by cores 106 and/or logic 140) for one or more locations, e.g., based on sensor data from various locations such as shown (outdoor, indoor, in car, etc.) and discussed with reference to FIG. 1. In some embodiments, different ambient noise threshold levels/values (also referred to herein as trigger levels/values) may be set depending on the time of day (e.g., where a café may be more noisy around breakfast, lunch, or dinner than other times). The determined threshold values are stored in memory (such as any of the storage devices discussed herein) for future access by the device (or shared amongst devices coupled to the same WiFi/WWAN network). Also, the trigger information may be available at a web site, and the location aware logic identifies the location of the device and obtains the audio trigger setting (e.g., similar to the way we obtain temperature/weather info for a specific city). Hence, operation 202 automates the setting (e.g., retrieved from the database) of the ambient noise trigger threshold profile for the always-on-always-listen subsystem based on the location of a mobile computing device.

The always-on-always-listen voice recognition implementation on mobile devices may include two or more stages: the first stage—Voice Command Detection (e.g., at operation 204) uses a low power audio processor (such as audio processor 160) to monitor the ambient noise. The power consumption for this audio processor may be in the range of a few micro watts and the low power audio processor may be on all the time. If this low power audio processor detects a sound level above the ambient noise level (e.g., at 206), it will trigger the second stage-Key Phrase Detection (e.g., at operation 208) which turns on a higher performance audio processor (such as a DSP and/or one or more of the processor cores 106) to analyze whether the captured sound is a command (e.g., a voice command or Key Phrase). If the captured sound is determined to be a command or Key Phrase (e.g., by comparing the captured sound against a list/table of allowable voice commands or Key Phrases), the higher performance audio processor will then carry out the corresponding command; otherwise, if it is not a command; the voice recognition sub-system (e.g., logic 140 and/or audio processor 160) will go back to idle state, or to the low power state. This higher performance audio processor (or the function of this DSP can be replaced by a Central Processing Unit (CPU) or processor 102/core 106) which may consumes 4 mW or more, depending on the implementation.

Furthermore, if the system continues to receive false triggers in the "Key Phrase Detection" state, the system may waste extra power to handle these false triggers. For mobile devices, moving from one location to another tends to modify the ambient noise levels. If the ambient noise level is set according to where the user device is located, the frequency of the false trigger can be reduced. To this end, an embodiments automates the setting of the ambient noise trigger level calibrated (also interchangeably referred to herein as analyzed) for different locations, such as at the lab, in the car, at the office, etc.

Some embodiments utilize the following techniques to calibrate/analyze and set the ambient noise level:
1. For indoor:
   (a) Use a WiFi location based tool to determine the location of the user device. The user uses calibration logic (e.g., logic 140) to set the ambient noise floor/minimum at that particular place;
   (b) Use compass and accelerometer to determine the location of the user device (also referred to as dead reckoning technique).
2. For outdoor: use GPS (e.g., aGPS, GNSS, etc.) to determine if the user is on a busy street, hiking in the wood, etc. The user may utilize calibration logic to calibrate the ambient noise floor/minimum at various places.
3. Inside a car: utilize the in car wireless devices, such as hands free BT (Bluetooth), to determine whether the user device is in a car. The "in car entertainment system" can also use BT to provide info to the calibration logic (e.g., running on the mobile device) that the car driver has turned on the audio device in the car (for example, to listen to the radio) and the volume setting information can be related to the calibration logic, which can provide a more accurate estimation of the ambient noise trigger level for the always-on-always-listen low power audio processor (operating in the "Voice Command Detection" state).

The ambient noise trigger/threshold levels may be calibrated/analyzed for different times of the day at a given location. In an embodiment, the ambient noise trigger levels may be adjusted based on both ambient noise and conversation levels. For example, a user may arrive at a café at 7:30 am to get a cup of coffee (based on location and time, stage 1 (Voice Command Detection State) audio trigger may be set at 73 dB). Later, at 8 am, the user may be walking through a hallway (based on location and time the stage 1 audio trigger may be set at 70 dB, e.g., since conversation levels and/or ambient noise levels may be lower in the hallway at that hour). Once the user returns to his/her office after 8 am (based on location and time, the stage 1 audio trigger may be set at 70 db. Subsequently, at 10 am, the user returns to the café for a one-on-one meeting (based on the location and time, the stage 1 audio trigger may be set at 84 dB, e.g., since the one-on-one meeting may have a higher sound level (due to conversation at the meeting) than the café or the hallway).

In an embodiment, the audio trigger profile is generated for a specific location. It has been noted that people will generally adjust their conversation voice level ("SPL" or Sound Pressure Level) a few dB's above the ambient noise level. Hence, if we can establish the ambient noise level, and add approximately 3-5 dB's above that level, then that can be the setting of the trigger level for the first stage (Voice Command Detection State) of "Always-on-always-listen" voice recognition logic. In some embodiments, the following process may be used to define and use the ambient noise level:

(A) Capture the ambient noise and conversation around the clock or at select time periods at a specific location. This can be done manually, or by writing an application and running it on a recording device (such as an Ultrabook computing device) to facilitate the capture/sampling task. In an embodiment, one minute/sample may be used. Also, the time of sampling may be stored.

(B) Create a look-up table for the captured data.

(C) Whenever the voice recognition logic is turned on/active: the logic (e.g., logic 140) locates the device (which runs this recognition engine) by location tracking logic, eCompass, accelerometer, etc. Once location and time is known, the recognition logic checks the look-up table and selects the corresponding trigger setting (e.g., can be the ambient noise level+3 dB). The location tracking logic, sensors, etc. will keep on feeding the location information because the user may change locations (e.g., as discussed with reference to FIG. 3). The interval may be every 30 seconds or a minute (which may be user configurable) to conserve power.

In one embodiment, if the system is in a connected standby state (e.g., where the user device is in a lower power consumption state than an active state while still maintaining an active network connection, and also the system optionally wakes up periodically to execute required tasks), the detection of the location change will be aligned to the system's periodic wake states so as to minimize the system power drain (e.g., due to false triggers). Since the location change of the system will be slower than the periodic wake of the system in the connected standby state, the detection of location change can be aligned (but not as frequent—because location change is relatively slow, e.g., may be once every 30 seconds. Sensor input can provide the optimal determination of the "location fix" frequency) with system wake state to minimize the system power drain (e.g., due to false triggers).

In an embodiment, the location change detection frequency is optimized to reduce power consumption. A sensor hub (not shown, which may be coupled to the sensor(s) 150 and/or incorporated into logic 140) manages the sensors inputs (e.g., from sensor(s) 150) to optimize the battery life. The location detection frequency can be further reduced and this can be based on further UX studies. For example, the location change can be detected by accelerometer/motion sensor, gyroscope, GNSS/WWAN fixes, detection of other "new" radio devices (for instance, Bluetooth device in the car (hands free Bluetooth)), etc.

Accordingly, some embodiments utilize one or more of the following techniques (e.g., rather than relying on the manual setting of the noise trigger threshold by a user):
1. Use sensors and/or a mix of technologies, such as aGPS/GNSS, WWAN, BT, Wifi, etc. to set the ambient noise threshold trigger profile for different locations.
2. The correct profile (per the location of the mobile device) is retrieved to set/program the noise trigger level for the low power audio processor (e.g., as part of the always-on-always-listen subsystem).
3. This operations are automated. It also provides a more UX oriented and more accurate (e.g., involving minimum human error) setting of the noise trigger threshold to minimize the false trigger of the voice recognition system.

Figure 3:
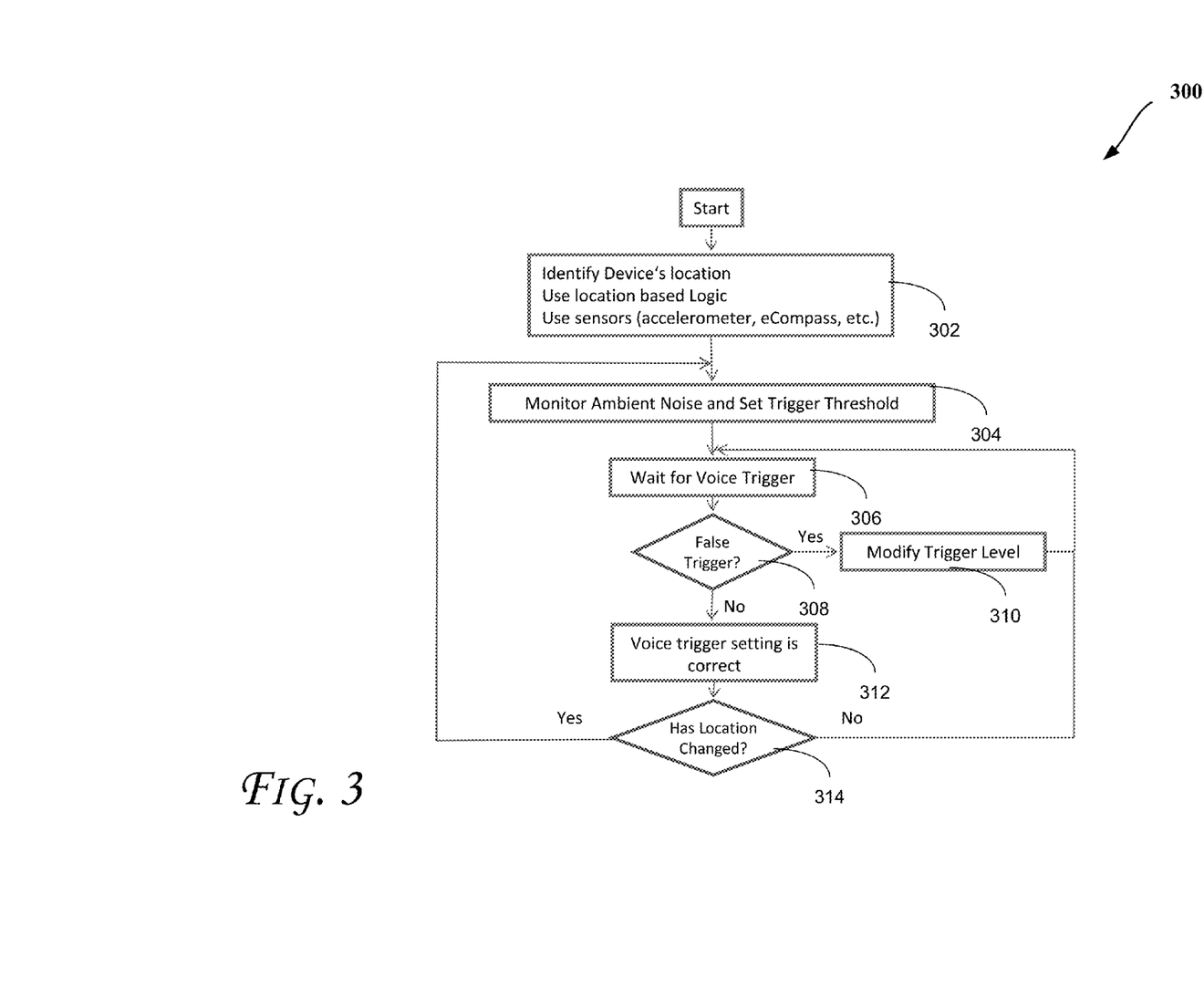

FIG. 3 illustrates a flow diagram of a method 300 for adaptive noise trigger setting adjustment to optimize system power consumption, according to an embodiment. This allows the voice recognition system to set the voice trigger threshold adaptively. One or more components discussed herein (e.g., with reference to FIGS. 1 and 3-6) may be used to perform one or more operations discussed with reference to FIG. 3. For example, one or more operations of method 300 may be performed by logic 140 (or its components discussed with reference to FIGS. 1-2) and/or sensor(s) 150), as discussed herein.

Referring to FIGS. 1-3, at an operation 302, the location of a user device is identified (by logic 140), e.g., based on sensor info (e.g., from one or more sensors 150). At an operation 304, the ambient noise is monitored (e.g., by logic 140 per sensor input from sensor(s) 150). For example the trigger threshold may be set to a number of dB's (e.g., 3 dB)

above the ambient noise level. An operation 306 (e.g., performed by logic 140) waits for a voice trigger (such as discussed with reference to FIG. 2). An operation at 308 (e.g., performed by logic 140) determines whether the trigger of operation 306 is a false trigger or not a command (such as discussed with reference to FIG. 2). If so, operation 310 (e.g., performed by logic 140) may modify the trigger threshold level by some number of dB's (e.g., 1 dB higher). Method 300 then returns to operation 306.

Otherwise, if operation 308 determines that the voice trigger of operation 306 is not false, operation 312 (e.g., performed by logic 140) determines that the voice trigger setting is correct and operation 314 (e.g., performed by logic 140, e.g., based on input from sensor(s) 150) will determine whether the device's location has changed. If the location has changed, method 300 resumes at operation 304; otherwise, method 300 resumes at operation 306.

Figure 4:
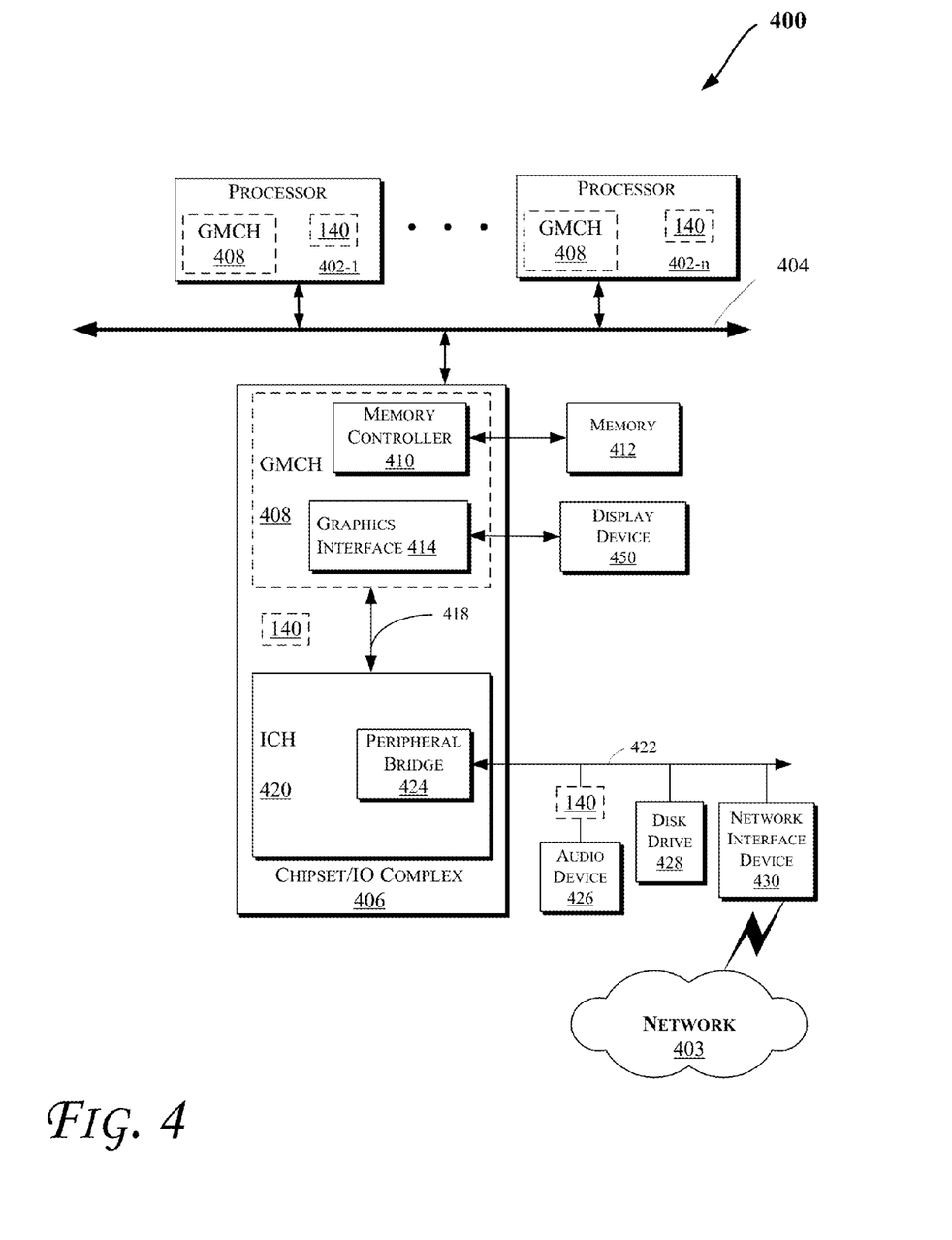

FIG. 4 illustrates a block diagram of a computing system 400 in accordance with an embodiment. The computing system 400 may include one or more Central Processing Units (CPUs) 402 or processors that communicate via an interconnection network (or bus) 404. The processors 402 may include a general purpose processor, a network processor (that processes data communicated over a computer network 403), or other types of a processor (including a reduced instruction set computer (RISC) processor or a complex instruction set computer (CISC)).

Moreover, the processors 402 may have a single or multiple core design. The processors 402 with a multiple core design may integrate different types of processor cores on the same integrated circuit (IC) die. Also, the processors 402 with a multiple core design may be implemented as symmetrical or asymmetrical multiprocessors. In an embodiment, one or more of the processors 402 may be the same or similar to the processors 102 of FIG. 1. Further, one or more components of system 400 may include logic 140 coupled to sensor(s) 150 (not shown in FIG. 4) discussed with reference to FIGS. 1-3 (including but not limited to those locations illustrated in FIG. 4). Also, the operations discussed with reference to FIGS. 1-3 may be performed by one or more components of the system 400.

A chipset 406 may also communicate with the interconnection network 404. The chipset 406 may include a graphics memory control hub (GMCH) 408, which may be located in various components of system 400 (such as those shown in FIG. 4). The GMCH 408 may include a memory controller 410 that communicates with a memory 412 (which may be the same or similar to the memory 114 of FIG. 1). The memory 412 may store data, including sequences of instructions, that may be executed by the CPU 402, or any other device included in the computing system 400. In one embodiment, the memory 412 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 404, such as multiple CPUs and/or multiple system memories.

The GMCH 408 may also include a graphics interface 414 that communicates with a display device 450. In one embodiment, the graphics interface 414 may communicate with the display device 450 via an accelerated graphics port (AGP) or Peripheral Component Interconnect (PCI) (or PCI express (PCIe) interface). In an embodiment, the display (such as a flat panel display) may communicate with the graphics interface 414 through, for example, a signal converter that translates a digital representation of an image stored in a storage device such as video memory or system memory into display signals that are interpreted and displayed by the display device. The display signals produced may pass through various control devices before being interpreted by and subsequently displayed on the display device 450.

A hub interface 418 may allow the GMCH 408 and an input/output control hub (ICH) 420 to communicate. The ICH 420 may provide an interface to I/O device(s) that communicate with the computing system 400. The ICH 420 may communicate with a bus 422 through a peripheral bridge (or controller) 424, such as a peripheral component interconnect (PCI) bridge, a universal serial bus (USB) controller, or other types of peripheral bridges or controllers. The bridge 424 may provide a data path between the CPU 402 and peripheral devices. Other types of topologies may be utilized. Also, multiple buses may communicate with the ICH 420, e.g., through multiple bridges or controllers. Moreover, other peripherals in communication with the ICH 420 may include, in various embodiments, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 422 may communicate with an audio device 426, one or more disk drive(s) 428, and a network interface device 430 (which is in communication with the computer network 403). Other devices may communicate via the bus 422. Also, various components (such as the network interface device 430) may communicate with the GMCH 408 in some embodiments. In addition, the processor 402 and the GMCH 408 may be combined to form a single chip. Furthermore, a graphics accelerator may be included within the GMCH 408 in other embodiments.

Furthermore, the computing system 400 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 428), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

Figure 5:
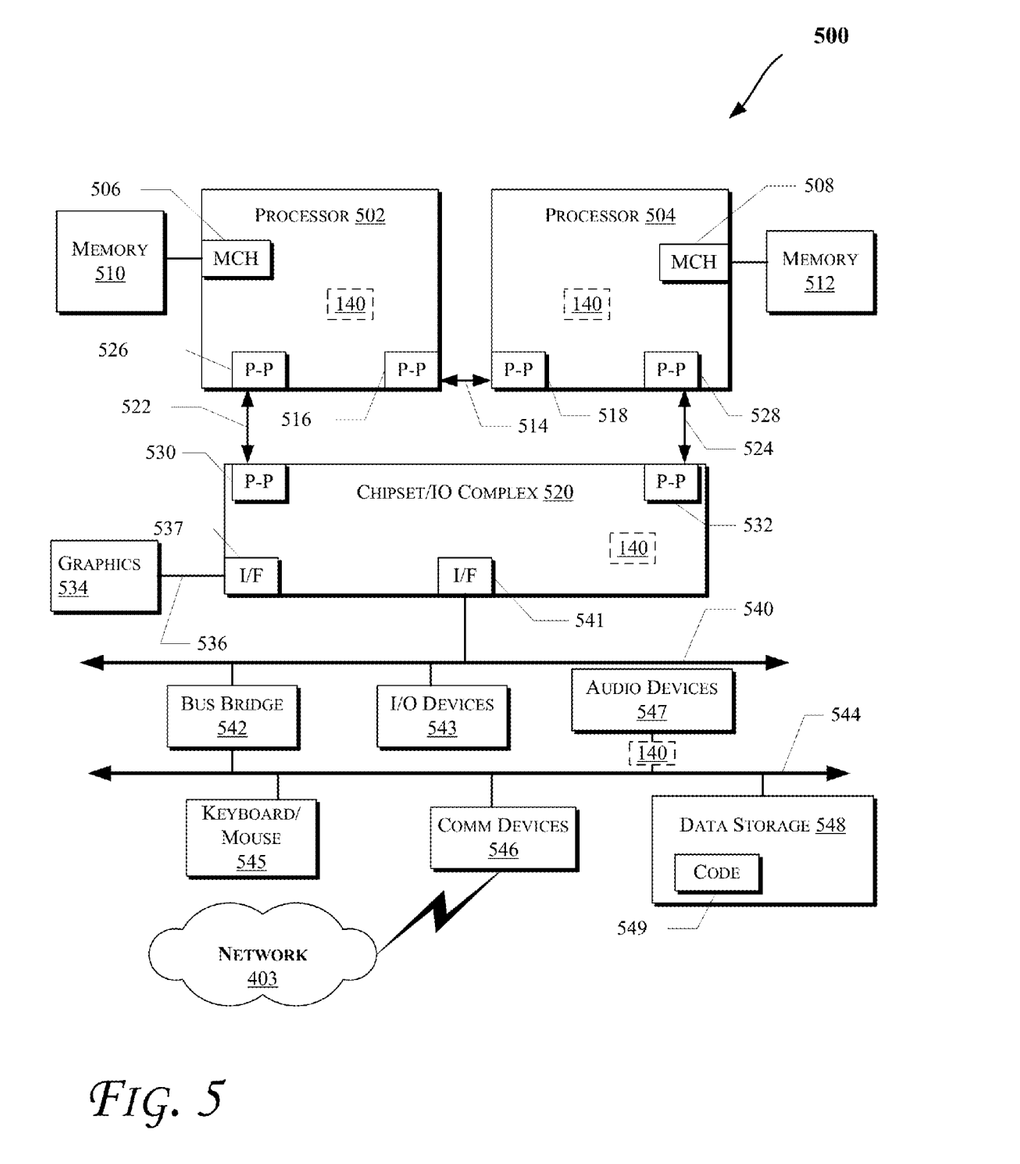

FIG. 5 illustrates a computing system 500 that is arranged in a point-to-point (PtP) configuration, according to an embodiment. In particular, FIG. 5 shows a system where processors, memory, and input/output devices are interconnected by a number of point-to-point interfaces. The operations discussed with reference to FIGS. 1-4 may be performed by one or more components of the system 500.

As illustrated in FIG. 5, the system 500 may include several processors, of which only two, processors 502 and 504 are shown for clarity. The processors 502 and 504 may each include a local memory controller hub (MCH) 506 and 508 to enable communication with memories 510 and 512. The memories 510 and/or 512 may store various data such as those discussed with reference to the memory 412 of FIG. 4.

In an embodiment, the processors 502 and 504 may be one of the processors 402 discussed with reference to FIG. 4. The processors 502 and 504 may exchange data via a point-to-point (PtP) interface 514 using PtP interface circuits 516 and 518, respectively. Also, the processors 502 and 504 may each exchange data with a chipset 520 via individual PtP interfaces 522 and 524 using point-to-point interface circuits 526, 528, 530, and 532. The chipset 520 may further exchange data with a graphics circuit 534 via a graphics interface 536, e.g., using a PtP interface circuit 537.

At least one embodiment may be provided within the processors 502 and 504. Further, one or more components of system 500 may include logic 140 coupled to sensor(s) 150 (not shown in FIG. 5) discussed with reference to FIGS. 1-4 (including but not limited to those locations illustrated in FIG. 5). Other embodiments, however, may exist in other circuits, logic units, or devices within the system 500 of FIG. 5. Furthermore, other embodiments may be distributed throughout several circuits, logic units, or devices illustrated in FIG. 5.

The chipset 520 may communicate with a bus 540 using a PtP interface circuit 541. The bus 540 may communicate with one or more devices, such as a bus bridge 542 and I/O devices 543. Via a bus 544, the bus bridge 542 may communicate with other devices such as a keyboard/mouse 545, communication devices 546 (such as modems, network interface devices, or other communication devices that may communicate with the computer network 403), audio I/O device 547, and/or a data storage device 548. The data storage device 548 may store code 549 that may be executed by the processors 502 and/or 504.

Figure 6:
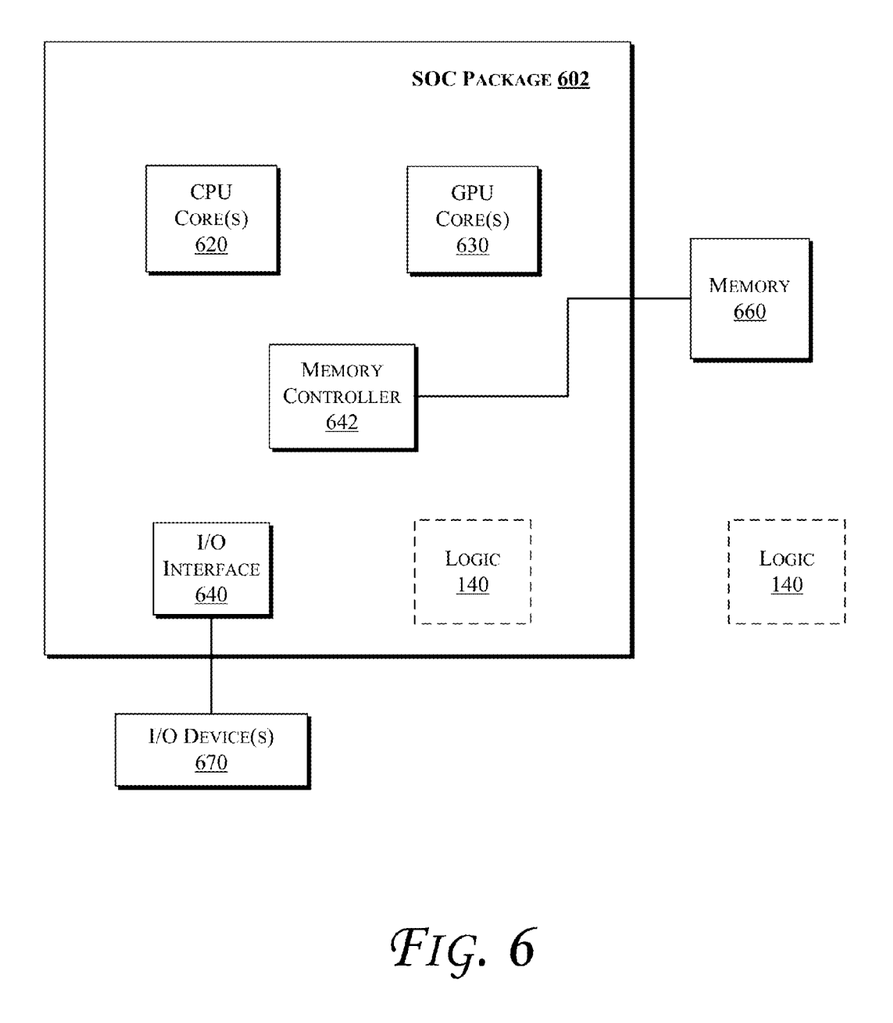
FIG. 6 illustrates a block diagram of an SOC (System On Chip) package in accordance with an embodiment.

In some embodiments, one or more of the components discussed herein can be embodied as a System On Chip (SOC) device. FIG. 6 illustrates a block diagram of an SOC package in accordance with an embodiment. As illustrated in FIG. 6, SOC 602 includes one or more Central Processing Unit (CPU) cores 620, one or more Graphics Processing Unit (GPU) cores 630, an Input/Output (I/O) interface 640, and a memory controller 642. Various components of the SOC package 602 may be coupled to an interconnect or bus such as discussed herein with reference to the other figures. Also, the SOC package 602 may include more or less components, such as those discussed herein with reference to the other figures. Further, each component of the SOC package 620 may include one or more other components, e.g., as discussed with reference to the other figures herein. In one embodiment, SOC package 602 (and its components) is provided on one or more Integrated Circuit (IC) die, e.g., which are packaged into a single semiconductor device.

As illustrated in FIG. 6, SOC package 602 is coupled to a memory 660 (which may be similar to or the same as memory discussed herein with reference to the other figures) via the memory controller 642. In an embodiment, the memory 660 (or a portion of it) can be integrated on the SOC package 602.

The I/O interface 640 may be coupled to one or more I/O devices 670, e.g., via an interconnect and/or bus such as discussed herein with reference to other figures. I/O device(s) 670 may include one or more of a keyboard, a mouse, a touchpad, a display device, an image/video capture device (such as a camera or camcorder/video recorder), a touch screen, a speaker, or the like. Furthermore, SOC package 602 may include/integrate logic 140 in an embodiment. Alternatively, logic 140 may be provided outside of the SOC package 602 (i.e., as a discrete logic).

Moreover, the scenes, images, or frames discussed herein (e.g., which may be processed by the graphics logic in various embodiments) may be captured by an image capture device (such as a digital camera (that may be embedded in another device such as a smart phone, a tablet, a laptop, a stand-alone camera, etc.) or an analog device whose captured images are subsequently converted to digital form). Moreover, the image capture device may be capable of capturing multiple frames in an embodiment. Further, one or more of the frames in the scene are designed/generated on a computer in some embodiments. Also, one or more of the frames of the scene may be presented via a display (such as the display discussed with reference to FIGS. 4 and/or 5, including for example a flat panel display device, etc.).

The following examples pertain to further embodiments. Example 1 includes an apparatus comprising: logic, the logic at least partially comprising hardware logic, to perform ambient noise trigger level analysis for a location and cause storage of an ambient noise trigger level threshold value for the location based on the ambient noise trigger level analysis, wherein logic is to determine whether to cause modification to a state of an audio processor in response to detection of the audio processor at the location and comparison of a detected sound level at the location and the stored ambient noise trigger level threshold value. Example 2 includes the apparatus of example 1, wherein logic to perform ambient noise trigger level analysis for the location is to cause storage of the ambient noise trigger level threshold value and a time of the analysis for the location. Example 3 includes the apparatus of example 1, wherein logic to cause modification to the state of the audio processor is to cause the audio processor or another processor to enter a high performance state or high power consumption state to detect a voice command. Example 4 includes the apparatus of example 1, wherein logic to cause modification to the state of the audio processor is to cause the audio processor or another processor to stay in a low power consumption state or low performance state in response to not detecting a voice command. Example 5 includes the apparatus of example 1, wherein one or more sensors are to detect data indicative of the location of the audio processor. Example 6 includes the apparatus of example 1, wherein the stored ambient noise trigger level threshold value for the location is to be shared amongst a plurality of computing devices. Example 7 includes the apparatus of example 6, wherein the plurality of the computing devices are to be coupled to the same computer network. Example 8 includes the apparatus of example 1, wherein detection of the audio processor at the location is to be aligned with periodic wake states. Example 9 includes the apparatus of example 1, wherein how often the detection of the audio processor at the location occurs is to be dynamically adjusted. Example 10 includes the apparatus of example 1, further comprising logic to adjust the ambient noise trigger level threshold value for the location based on a false trigger that occurs after performance of the ambient noise trigger level analysis for the location. Example 11 includes the apparatus of example 1, wherein a processor, having one or more processor cores, is to comprise the logic to perform the analysis. Example 12 includes the apparatus of any of examples 1 to 11, wherein one or more of the logic to perform the analysis, one or more processor cores, and memory are on a single integrated circuit die.

Example 13 includes a method comprising: performing ambient noise trigger level analysis for a location and cause storage of an ambient noise trigger level threshold value for the location based on the ambient noise trigger level analysis; and determining whether to cause modification to a state of an audio processor in response to detection of the audio processor at the location and comparison of a detected sound level at the location and the stored ambient noise trigger level threshold value. Example 14 includes the method of example 13, further comprising causing storage of the ambient noise trigger level threshold value and a time of the analysis for the location. Example 15 includes the method of example 13, further comprising causing the audio processor or another processor to enter a high performance state or a high power consumption state to detect a voice command. Example 16 includes the method of example 13, further comprising causing the audio processor or another processor to stay in a low performance state or a low power consumption state in response to not detecting a voice command. Example 17 includes the method of example 13, further comprising causing one or more sensors to detect data indicative of the location of the audio processor. Example 18 includes the method of example 13, further comprising sharing the stored ambient noise trigger level threshold value for the location amongst a plurality of computing devices. Example 19 includes the method of example 18, further comprising causing coupling of the plurality of the computing devices to the same computer network. Example 20 includes the method of example 13, further comprising aligning detection of the audio processor at the location with periodic wake states. Example 21 includes the method of example 13, further comprising dynamically adjusting how often the detection of the audio processor at the location occurs. Example 22 includes the method of example 13, further comprising adjusting the ambient noise trigger level threshold value for the location based on a false trigger that occurs after performance of the ambient noise trigger level analysis for the location.

Example 23 includes a computer-readable medium comprising one or more instructions that when executed on a processor configure the processor to perform one or more operations of any of examples 13 to 22.

Example 24 includes an apparatus comprising means to perform a method as set forth in any of example 13 to 22.

Example 25 includes a system comprising: memory to store one or more instructions; an audio processor to execute the one or more instructions; logic, the logic at least partially comprising hardware logic, to perform ambient noise trigger level analysis for a location and cause storage of an ambient noise trigger level threshold value for the location based on the ambient noise trigger level analysis, wherein logic is to determine whether to cause modification to a state of the audio processor in response to detection of the audio processor at the location and comparison of a detected sound level at the location and the stored ambient noise trigger level threshold value. Example 26 includes the system of example 25, wherein logic to perform ambient noise trigger level analysis for the location is to cause storage of the ambient noise trigger level threshold value and a time of the analysis for the location. Example 27 includes the system of example 25, wherein logic to cause modification to the state of the audio processor is to cause the audio processor or another processor to enter a high performance state or high power consumption state to detect a voice command. Example 28 includes the system of example 25, wherein logic to cause modification to the state of the audio processor is to cause the audio processor or another processor to stay in a low power consumption state or low performance state in response to not detecting a voice command. Example 29 includes the system of example 25, wherein one or more sensors are to detect data indicative of the location of the audio processor. Example 30 includes the system of example 25, wherein the stored ambient noise trigger level threshold value for the location is to be shared amongst a plurality of computing devices. Example 31 includes the system of example 30, wherein the plurality of the computing devices are to be coupled to the same computer network. Example 32 includes the system of example 25, wherein detection of the audio processor at the location is to be aligned with periodic wake states. Example 33 includes the system of example 25, wherein how often the detection of the audio processor at the location occurs is to be dynamically adjusted. Example 34 includes the system of example 25, further comprising logic to adjust the ambient noise trigger level threshold value for the location based on a false trigger that occurs after performance of the ambient noise trigger level analysis for the location. Example 35 includes the system of example 25, wherein a processor, having one or more processor cores, is to comprise the logic to perform the analysis. Example 36 includes the system of any of examples 25 to 35, wherein one or more of the logic to perform the analysis, one or more processor cores, and the memory are on a single integrated circuit die.

Example 37 includes an apparatus comprising means to perform a method as set forth in any preceding example.

Example 38 includes a machine-readable storage including machine-readable instructions, when executed, to implement a method or realize an apparatus as set forth in any preceding example.

In various embodiments, the operations discussed herein, e.g., with reference to FIGS. 1-6, may be implemented as hardware (e.g., logic circuitry), software, firmware, or combinations thereof, which may be provided as a computer program product, e.g., including a tangible (e.g., non-transitory) machine-readable or computer-readable medium having stored thereon instructions (or software procedures) used to program a computer to perform a process discussed herein. The machine-readable medium may include a storage device such as those discussed with respect to FIGS. 1-6.

Additionally, such computer-readable media may be downloaded as a computer program product, wherein the program may be transferred from a remote computer (e.g., a server) to a requesting computer (e.g., a client) by way of data signals provided in a carrier wave or other propagation medium via a communication link (e.g., a bus, a modem, or a network connection).

Reference in the specification to "one embodiment" or "an embodiment" means that a particular feature, structure, and/or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
   performance logic, the performance logic at least partially comprising hardware logic, to perform ambient noise trigger level analysis for a location and cause storage of an ambient noise trigger level threshold value for the location based on the ambient noise trigger level analysis, wherein modification logic is to determine whether to cause modification to a state of an audio processor in response to detection of the audio processor at the location and comparison of a detected sound level at the location and the stored ambient noise trigger level threshold value, wherein the ambient noise trigger level threshold value is to be selected from a plurality of ambient noise trigger level threshold values, wherein each of the plurality of ambient noise trigger level threshold values is to correspond to a different type of location for the audio processor.

2. The apparatus of claim 1, wherein performance logic is to cause storage of the ambient noise trigger level threshold value and a time of the analysis for the location.

3. The apparatus of claim 1, wherein modification logic is to cause the audio processor or another processor to enter a high performance state or high power consumption state to detect a voice command.

4. The apparatus of claim 1, wherein modification logic is to cause the audio processor or another processor to stay in a low power consumption state or low performance state in response to not detecting a voice command.

5. The apparatus of claim 1, wherein one or more sensors are to detect data indicative of the location of the audio processor.

6. The apparatus of claim 1, wherein the stored ambient noise trigger level threshold value for the location is to be shared amongst a plurality of computing devices.

7. The apparatus of claim 6, wherein the plurality of the computing devices are to be coupled to the same computer network.

8. The apparatus of claim 1, wherein detection of the audio processor at the location is to be aligned with periodic wake states.

9. The apparatus of claim 1, wherein how often the detection of the audio processor at the location occurs is to be dynamically adjusted.

10. The apparatus of claim 1, further comprising logic to adjust the ambient noise trigger level threshold value for the location based on a false trigger that occurs after performance of the ambient noise trigger level analysis for the location.

11. The apparatus of claim 1, wherein a processor, having one or more processor cores, is to comprise the performance logic.

12. The apparatus of claim 1, wherein one or more of the performance logic, one or more processor cores, and memory are on a single integrated circuit die.

13. A method comprising:
performing ambient noise trigger level analysis for a location and cause storage of an ambient noise trigger level threshold value for the location based on the ambient noise trigger level analysis; and
determining whether to cause modification to a state of an audio processor in response to detection of the audio processor at the location and comparison of a detected sound level at the location and the stored ambient noise trigger level threshold value, wherein the ambient noise trigger level threshold value is selected from a plurality of ambient noise trigger level threshold values, wherein each of the plurality of ambient noise trigger level threshold values corresponds to a different type of location for the audio processor.

14. The method of claim 13, further comprising causing storage of the ambient noise trigger level threshold value and a time of the analysis for the location.

15. The method of claim 13, further comprising causing the audio processor or another processor to enter a high performance state or a high power consumption state to detect a voice command.

16. The method of claim 13, further comprising causing the audio processor or another processor to stay in a low performance state or a low power consumption state in response to not detecting a voice command.

17. The method of claim 13, further comprising causing one or more sensors to detect data indicative of the location of the audio processor.

18. The method of claim 13, further comprising sharing the stored ambient noise trigger level threshold value for the location amongst a plurality of computing devices.

19. The method of claim 18, further comprising causing coupling of the plurality of the computing devices to the same computer network.

20. The method of claim 13, further comprising aligning detection of the audio processor at the location with periodic wake states.

21. The method of claim 13, further comprising dynamically adjusting how often the detection of the audio processor at the location occurs.

22. The method of claim 13, further comprising adjusting the ambient noise trigger level threshold value for the location based on a false trigger that occurs after performance of the ambient noise trigger level analysis for the location.

23. A non-transitory computer-readable medium comprising one or more instructions that when executed on a processor configure the processor to perform one or more operations to:
perform ambient noise trigger level analysis for a location and cause storage of an ambient noise trigger level threshold value for the location based on the ambient noise trigger level analysis; and
determine whether to cause modification to a state of an audio processor in response to detection of the audio processor at the location and comparison of a detected sound level at the location and the stored ambient noise trigger level threshold value, wherein the ambient noise trigger level threshold value is to be selected from a plurality of ambient noise trigger level threshold values, wherein each of the plurality of ambient noise trigger level threshold values is to correspond to a different type of location for the audio processor.

24. The non-transitory computer-readable medium of claim 23, further comprising one or more instructions that when executed on the processor configure the processor to perform one or more operations to cause storage of the ambient noise trigger level threshold value and a time of the analysis for the location.

25. The non-transitory computer-readable medium of claim 23, further comprising one or more instructions that when executed on the processor configure the processor to perform one or more operations to cause the audio processor or another processor to enter a high performance state or a high power consumption state to detect a voice command.

* * * * *